(12) United States Patent
Carlstedt et al.

(10) Patent No.: US 10,887,078 B2
(45) Date of Patent: Jan. 5, 2021

(54) DEVICE, SYSTEM, AND METHOD FOR DETERMINING A FORWARDING DELAY THROUGH A NETWORKING DEVICE

(71) Applicant: Wind River Systems, Inc., Alameda, CA (US)

(72) Inventors: Markus Carlstedt, Uppsala (SE); Kenneth Jonsson, Sollentuna (SE)

(73) Assignee: Wind River Systems, Inc., Alameda, CA (US)

( * ) Notice: Subject to any disclaimer, the term of this patent is extended or adjusted under 35 U.S.C. 154(b) by 317 days.

(21) Appl. No.: 15/646,886

(22) Filed: Jul. 11, 2017

(65) Prior Publication Data

US 2019/0020465 A1    Jan. 17, 2019

(51) Int. Cl.
| | |
|---|---|
| *H04L 7/00* | (2006.01) |
| *H04L 12/26* | (2006.01) |
| *H04B 1/38* | (2015.01) |
| *H04J 3/06* | (2006.01) |

(52) U.S. Cl.
CPC .............. *H04L 7/0037* (2013.01); *H04B 1/38* (2013.01); *H04L 43/0852* (2013.01); *H04L 43/106* (2013.01)

(58) Field of Classification Search
CPC ........ H04L 7/0037; H04L 43/106; H04B 1/38
See application file for complete search history.

(56) References Cited

U.S. PATENT DOCUMENTS

| 10,122,484 | B1* | 11/2018 | Kasichainula | ........ H04J 3/0644 |
|---|---|---|---|---|
| 2003/0056136 | A1* | 3/2003 | Aweya | .................... H03L 7/093 |
| | | | | 713/400 |
| 2004/0153534 | A1* | 8/2004 | Gibart | ................... H04L 43/106 |
| | | | | 709/223 |
| 2006/0056242 | A1* | 3/2006 | Takeshita | ................ H04L 12/56 |
| | | | | 365/189.05 |
| 2006/0077902 | A1* | 4/2006 | Kannan | .................. H04L 43/087 |
| | | | | 370/250 |
| 2006/0133426 | A1* | 6/2006 | Craddock | ................. G06F 1/14 |
| | | | | 370/503 |
| 2006/0280182 | A1* | 12/2006 | Williams | .............. H04J 3/0632 |
| | | | | 370/394 |
| 2007/0195777 | A1* | 8/2007 | Tatar | ................... H04L 49/1546 |
| | | | | 370/392 |
| 2008/0144624 | A1* | 6/2008 | Marcondes | ......... H04L 43/0829 |
| | | | | 370/392 |

(Continued)

*Primary Examiner* — Noel R Beharry
*Assistant Examiner* — Wilfred Thomas
(74) *Attorney, Agent, or Firm* — Fay Kaplun & Marcin, LLP (57) ABSTRACT

A device, system, and method determines a forwarding delay through a networking device. The method is performed at the networking device including a transceiver and an always running timer (ART). The method includes generating a first timestamp using a first clock of the transceiver when a packet to be forwarded has been received. The method includes capturing a first ART time corresponding to the first timestamp. The method includes generating a second timestamp using a second clock of the transceiver when the packet to be forwarded has been transmitted. The method includes capturing a second ART time corresponding to the second timestamp. The method includes determining a forwarding delay based on the first and second timestamps and the first and second ART times.

20 Claims, 3 Drawing Sheets

(56) References Cited

U.S. PATENT DOCUMENTS

2008/0181112 A1* 7/2008 Beck ................ H04J 3/0632
370/235
2017/0285710 A1* 10/2017 Ardanaz ............ G06F 1/3287

* cited by examiner

DEVICE, SYSTEM, AND METHOD FOR DETERMINING A FORWARDING DELAY THROUGH A NETWORKING DEVICE

BACKGROUND INFORMATION

A networking device may be a component associated with a network that is used in forwarding data between electronic devices connected to the network. For example, a voice or video call may be performed between two electronic devices connected to the network. Accordingly, voice and/or video data packets may be received by the networking device from a first one of the electronic devices and forwarded/transmitted to a second one of the electronic devices. In another example, an electronic device connected to the network may be utilizing a browser application and a request may have been transmitted to a webpage server. Accordingly, webpage data packets may be received from the webpage server and forwarded/transmitted to the electronic device to be displayed on the browser application. Examples of networking devices ma include routers, switches, bridges, gateways, etc.

The networking device, when providing this data exchange functionality, must have accurate timing information related to when the data is being forwarded and how long the forwarding operation takes, particularly since networks use schedules and timing parameters of when particular operations are to be performed. Specifically, changes in packet forwarding latency may be used to predict future potential congestion which gives more time to apply countermeasures. Accordingly, highly accurate timing information may provide a more efficient and correct manner of performing data forwarding operations by the network to connected electronic devices. In performing a data packet forwarding, the data is prepared by first being received, then being processed, and subsequently being transmitted. This forwarding procedure inevitably creates a forwarding delay. Therefore, a determination of a time length of the actual forwarding delay provides an important parameter in tuning an overall network performance.

SUMMARY

The exemplary embodiments are directed to a method, comprising: at a networking device including a transceiver and an always running timer (ART): generating a first timestamp using a first clock of the transceiver when a packet to be forwarded has been received; capturing a first ART time corresponding to the first timestamp; generating a second timestamp using a second clock of the transceiver when the packet to be forwarded has been transmitted; capturing a second ART time corresponding to the second timestamp; and determining a forwarding delay based on the first and second timestamps and the first and second ART times.

The exemplary embodiments are directed to a networking device, comprising: a transceiver configured to forward a packet; a first clock generating a first timestamp when the packet to be forwarded has been received; a second clock generating a second timestamp when the packet to be forwarded has been transmitted; an always running timer (ART) capturing a first ART time corresponding to the first timestamp and capturing a second ART time corresponding to the second timestamp; and a processor determining a forwarding delay based on the first and second timestamps and the first and second ART times.

The exemplary embodiments are directed to a networking device, comprising: a transceiver configured to forward a packet; a first clock generating a first timestamp when the packet to be forwarded has been received; a second clock generating a second timestamp when the packet to be forwarded has been transmitted; an always running timer (ART) capturing a first ART time corresponding to the first timestamp and capturing a second ART time corresponding to the second timestamp; and a processor determining a forwarding delay based on the first and second timestamps and the first and second ART times, wherein the ART is a modular component coupled to the networking device.

DETAILED DESCRIPTION

The exemplary embodiments may be further understood with reference to the following description and the related appended drawings, wherein like elements are provided with the same reference numerals. The exemplary embodiments are related to a device, a system, and a method of determining a total forwarding delay associated with forwarding a packet of data through a networking device. Specifically, when a packet is received by the networking device and to be forwarded to an electronic device connected to the network, a forwarding procedure is used which requires an amount of time or creates a forwarding delay. By determining this forwarding delay in an accurate manner in which latency is minimized or eliminated, the overall network performance of the network may be improved, at least from the contribution by the networking device.

Initially, it is noted that the exemplary embodiments are described with regard to forwarding data using a networking device. However, the use of the networking device and the implementation with a data forwarding operation are only exemplary. As will be described in further detail below, the exemplary embodiments relate to accurately determining a time associated with performing an operation of an electronic device. Accordingly, the exemplary embodiments may be used and/or modified for measuring a time using a comparable mechanism described herein in which internal timers of a component of the electronic device include errors arising from latency related issues and compensating for these errors with more reliable timing information. For example, in another exemplary implementation, the exemplary embodiments may be used with an audio receiving device (e.g., a microphone) coupled to the electronic device (e.g., via a Universal Serial Bus (USB)) in which a delay may be determined for transmitting audio data.

There are various types of networking devices configured to forward packets of data. The forwarding operation of a networking device may entail forwarding a packet of data from a first electronic device to a second electronic device that are connected to a network including the networking device. In this context, the electronic devices may represent any device connected to the network including edge devices, intermediary devices, other networking devices, etc. The forwarding operation may include receiving the packet from the first electronic device at an ingress port of the networking device and transmitting the packet to the second electronic device at an egress port. Depending on the type of equipment of the networking device, there may be a varying amount of data processing that is applied to each frame of the forwarding operation. To cope with bursty traffic loads and alternating traffic patterns, the networking devices use respective buffering techniques corresponding to the type of equipment.

Generally, there are two types of networking devices that are used in networks. A first type of networking device is one built on specialized hardware including network processors. In a first example of the first type, the networking device may be an application-specific integrated circuit (ASIC). The ASIC may be an integrated circuit (IC) that has been customized for a specific use. Accordingly, as related to the objectives of the exemplary embodiments, the ASIC networking device may be manufactured with customized hardware that is used to perform the forwarding functionality. In a second example of the first type, the networking device may be a field programmable gate array (FPGA). The FPGA may also be an IC that is customized at a time after manufacturing of the hardware. Using a similar hardware description language (HDL) of an ASIC, the FPGA may be configured using a general specification with the HDL. Accordingly, using logic blocks (e.g., logic gates) that are inter-wired, the IC of the FPGA may be programmable to be used in a specified manner. Again, as related to the objectives of the exemplary embodiments, the FPGA networking device may be customized by a user to perform the forwarding functionality.

As those skilled in the art will understand, the forwarding delay or latency through the hardware of the networking device is a highly important parameter in tuning the overall network performance. As buffering of packets of data to be forwarded may have a significant effect on an amount of the forwarding delay, an accurate way of measuring this latency provides invaluable information to the network. Using the first type of networking device in which the hardware may be specifically customized for the forwarding operation, determining a measurement procedure may be less challenging as the designer customizing the networking device has control over the timebases or clocks used to measure the forwarding delay in the networking device. The designer may also customize the networking device so that different subsystems of the networking device use the same timebase or clock. Accordingly, the first type of networking device may include or be customized to include an accurate measuring operation of the forwarding delay.

The second type of networking device is one built from commercial off the shelf (COTS) hardware. As those skilled in the art will understand, COTS hardware may be a packaged piece of hardware having pre-defined functionalities that are performed in predetermined manners, the pre-defined functionalities satisfying any needs of the purchaser. Accordingly, COTS hardware may refer to hardware that is not customizable but allows for reduced costs in installation and use. COTS hardware also allows for replacement of COTS hardware with another identical (or upgraded) version of the same COTS hardware. As no customization to the COTS hardware is required (or allowed), the replacement may be performed easily.

In one example, the networking device of this second type may be a blade server populated with standard network interface cards (NICs). The NIC may be a piece of hardware configured to connect an electronic device to a network. In establishing this connection, packets of data may be exchanged with the network and a forwarding functionality may be utilized. A blade server may have a modular design in which components such as NICs may be modularly incorporated into the blade server. The blade server may also optimize the use of a physical space and minimize energy requirements. With the various features of the blade server (e.g., cooling, networking, etc.), a plurality of NICs may be included in the blade server for the NICs to collectively provide the server functionalities for the network.

However, it is again noted that the forwarding delay through the second type of networking device is an important parameter to tune the overall network performance. In contrast to the customizable features of the first type of networking device, the measurement of the forwarding delay may be limited to the available components of the networking device and the COTS hardware included therein. For example, there may be a first internal timer or first clock associated with the ingress port where packets of data are received and a second internal timer or second clock associated with the egress port where packets of data are transmitted. Although these clocks may allow for time-stamping or identifying a time when a certain action has occurred, those skilled in the art will understand that there is a natural skew between the clocks causing an error to the measurement of the forwarding delay.

Due to the limitations of the second type of networking device and the COTS hardware including the NICs that are used in the second type of networking device, the exemplary embodiments provide a mechanism to measure the forwarding delay by compensating for any errors that may occur from using the pre-installed clocks that are incorporated with the networking device. In this manner, the forwarding delay may be measured in an accurate way. As will be described in further detail below, the errors associated with the clocks of the networking device may be compensated for with an always running timer (ART) that may be incorporated or otherwise used by the networking device.

Figure 1:
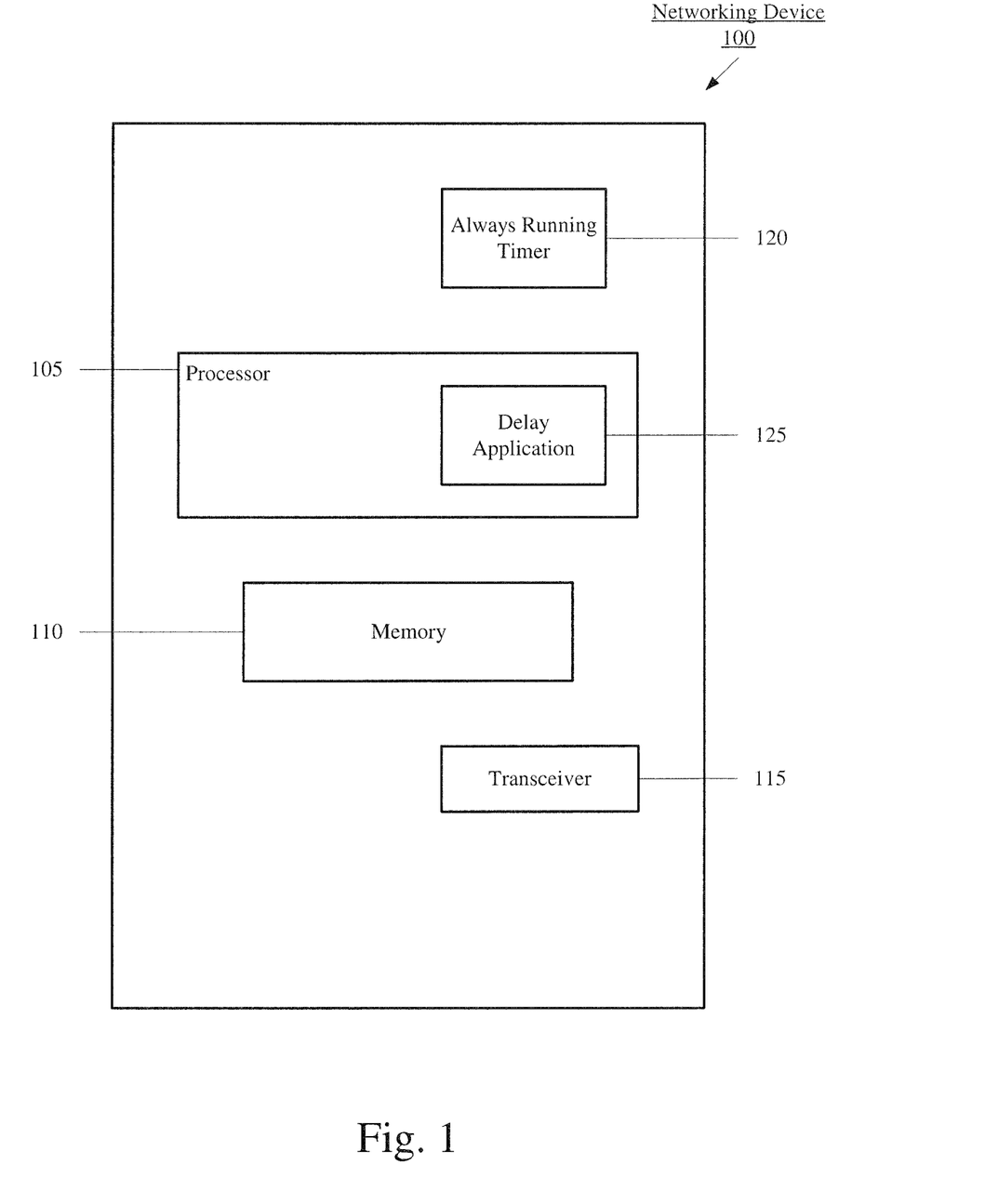
FIG. 1 shows a networking device according to the exemplary embodiments.

FIG. 1 shows components of a networking device 100 according to the exemplary embodiments. The networking device 100 may be configured to provide various functionalities corresponding to a type of networking device. For example, the networking device 100 may represent any electronic device used by a network to forward data such as a router, a switch, a bridge, a gateway, etc. Accordingly, the functionalities may include forwarding data between computer networks (for a router), connecting devices on the network with packet switching (for a switch), creating a single aggregate network from multiple networks or network segments (for a bridge), providing an interface with another network (for a gateway), etc. As noted above, the networking device 100 may utilize COTS hardware and/or may be configured to not be customizable but be provided with predetermined functionalities, operations, and subcomponents. The networking device 100 may include a processor 105, a memory 110, a transceiver 115, and an always running timer (ART) 120. The networking device 100 may further include one or more further components (not shown): a display device, an input/output (I/O) device, and other suitable components, such as, for example, a portable power supply, an audio I/O device, a data acquisition device, ports to electrically connect the networking device 100 to other electronic devices, etc.

The processor 105 may be configured to execute computer-executable instructions for operations from a plurality of applications that provide various functionalities to the networking device 100. For example, the plurality of applications may include a packet receiving application, a packet processing application, a packet transmitting application, etc. which may collectively be used in a forwarding operation. In another example, the applications may include a clock application or timestamp application that identifies when a particular operation has been performed based on an associated clock. In a further example and as related to the exemplary embodiments, the applications may include a delay application 125. The delay application 125 may be configured to utilize information from the transceiver 115 including any timing information and information from the ART 120 to ultimately determine the forwarding delay in performing the forwarding operation.

It should be noted that the applications executed by the processor 105 are only exemplary. As noted above, the applications may be operations or functionalities of an application represented as the processor 105. In another example, the functionalities described for the applications and the processor 105 may also be represented as a separately incorporated component of the electronic device 100 (e.g., an integrated circuit with or without firmware), or may be a modular component coupled to the electronic device 100. The functionalities may also be distributed throughout multiple components of the electronic device 100.

The memory 110 may be a hardware component configured to store data related to the functionalities performed by the electronic device 100. Specifically, the various information generated by the transceiver 115 and the ART 120 may be stored in the memory 110 for use by the processor 105, in particular, the delay application 125.

The transceiver 115 may be any component or group of components configured to exchange data with another electronic device through a connection (e.g., a network connection). As described above, the networking device 100 may include a forwarding operation used to forward a packet of data. The transceiver 115 may include the hardware, software, and firmware to provide this forwarding operation. When the network is a wireless network, the transceiver 115 may operate on different frequencies or channels for the packets to be received or transmitted properly. It is noted that the transceiver may be used for a wired or wireless connection and configured appropriately in forwarding packets of data in either type of connection.

As those skilled in the art will understand, the ART 120 may be an independent component continuously running at a constant frequency regardless of the operations or state of the networking device 100. For example, while in an active state and a plurality of different operations concurrently being performed, the ART 120 may be running to track a time using its own constant frequency. In another example, while in a hibernating state with only background operations being performed, the ART 120 may still be running to track the time using its own constant frequency. Accordingly, the ART 120 may include the appropriate hardware, software, and/or firmware to maintain this constant frequency to track the time. Based on this tracking of time, the ART 120 may provide a correlation between timebases (e.g., such as with clocks of the transceiver 115). For example, a timestamp generated by a clock of the transceiver 115 may trigger a time to be simultaneously captured by the ART 120. By receiving the timing information, the ART 120 may output a conversion of the captured ART value to the corresponding system clock of the networking device 100.

It is noted that the ART 120 being an incorporated component of the networking device 100 is only exemplary. As the networking device 100 may include only COTS hardware or the networking device 100 has minimal components included therein, the ART 120 may not be present. However, as the ART 120 provides a piece of information utilized by the exemplary embodiments, the ART 120 may be coupled to the networking device 100 or timing information from the ART 120 may be otherwise available for use by the networking device 100. For example, the ART 120 may be a modular component that is coupled to the networking device 100. In another example, if the simultaneous capture capability is possible, the timing information of the ART 120 may be received by the networking device 100 through any communication means.

Figure 2:
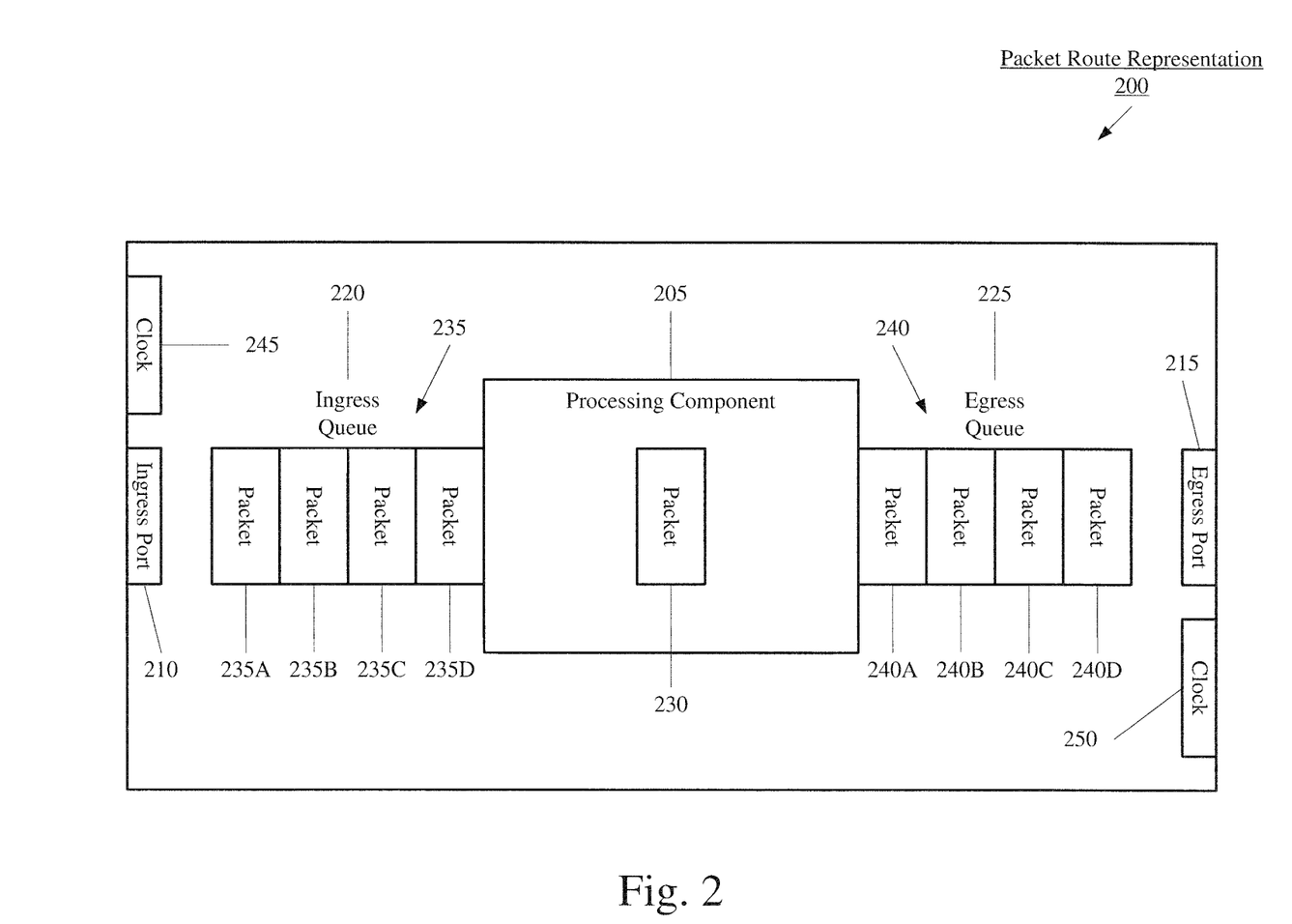
FIG. 2 shows a packet route representation according to the exemplary embodiments.

FIG. 2 shows a packet route representation 200 according to the exemplary embodiments. Specifically, the packet route representation 200 may be through the processor 105 and the transceiver 115 of the networking device 100 which utilizes various functionalities in providing the forwarding operation. The packet route representation 200 may include a processing component 205 which may be represented by the processor 105, a processing component of the transceiver 115, or a combination thereof. The processing component may be configured to process/prepare a packet of data that has been received via an ingress port 210 and to be transmitted via an egress port 215. When a packet has been received via the ingress port 210, the packet may be placed into an ingress queue 220. Upon reaching the end of the ingress queue 220, the processing component 205 may process/prepare the packet. Thereafter, the packet may be placed into an egress queue 225 prior to transmitting the packet out the egress port 215. For example, the ingress queue 220 may include a plurality of packets 235 (e.g., packets 235A-D), the processing component may be processing a packet 230, and the egress queue 225 may include a plurality of packets 240 (e.g., packets 240A-D). As noted above, the COTS hardware of the transceiver 115 may include a first clock 245 associated with the ingress port 210 to timestamp when a first operation has been performed (e.g., receiving a packet using the ingress port 210 and placing the packet in the ingress queue 220) and a second clock 250 associated with the egress port 215 to timestamp when a second operation has been performed (e.g., removing a packet from the egress queue 225 and transmitting the packet using the egress port 215).

It is noted that the forwarding operation shown in FIG. 2 for the networking device 100 is only exemplary. Specifically, the ingress queue 220, the egress queue 225, and the processing of the packets in the processing component 205 are only exemplary. For example, the use of four packets 235A-D in the ingress queue 220 is only exemplary. The ingress queue 220 may be configured to hold any number of packets based on the predefined specifications of the COTS hardware. The egress queue 225 may also be configured to hold any number of packets. In another example, the use of a single packet 230 at the processing component 205 is only exemplary. The processing component 205 may be configured to process any number of packets that are present in the ingress queue 220 and subsequently to be placed in the egress queue 225. In a further example, the inclusion of processing component 205, one ingress port 210, and one egress port 210 is only exemplary. The networking device 100 may include any number of processing components 205, ingress ports 210, and egress ports 210.

In view of the manner in which the forwarding operation is performed by the networking device 100, a total forwarding delay through the networking device 100 may include a queuing delay and a processing delay. As noted above, there may be a delay associated with being buffered in the ingress queue 220 and the egress queue 225. Therefore, the queuing delay may be caused by the packet being held in these queues 220, 225 while waiting to be processed (e.g., ingress queue 220) by the processing component 205 or waiting to be transmitted (e.g., egress queue 225). In this manner, the queuing delay may include an ingress queuing delay and an egress queuing delay. As illustrated in the packet route representation 200 shown in FIG. 2, while one packet (e.g., packet 230) is in flight at the processing component 205, there may be four packets buffered at the ingress queue 220 (e.g., packets 235A-D) from being received by the ingress port 210 and four packets buffered at the egress queue 225 (e.g., packets 240A-D) awaiting transmission by the egress port 215. A processing delay may be associated with being processed by the processing component 230.

It is again noted that the queues 220, 225 including the illustrated number of packets is only exemplary and the queues 220, 225 may hold any number of packets or be limited to a maximum number of packets that may be held. It is also noted that the use of the queues 220, 225 is only exemplary. In another manner of implementation, the networking device 100 may process one packet at a time. Thus, a packet received at the ingress port 210 may be processed by the processing component 205 and then transmitted out the egress port 215. In such an embodiment, the forwarding delay may only include the processing delay.

To measure the forwarding delay, the clock 245 associated with the ingress port 210 and the clock 250 associated with the egress port 215 may generate corresponding timestamps when a packet is received using the ingress port 210 and placed in the ingress queue 220 and when a packet is removed from the egress queue 225 and transmitted using the egress port 215, respectively. When the features of the exemplary embodiments are not incorporated, the forwarding delay may only be measured as a difference between the timestamps reported by the clocks 245, 250 when the packet has been received and when the packet has been transmitted, respectively. However, as noted above, the use of the clocks 245, 250 or the internal timer counter registers of the networking device 100 (which is a COTS NIC) includes an error caused by a clock skew between the two clocks 245, 250. As the clocks 245, 250 may not be perfectly aligned or track time in an identical manner (e.g., oscillators oscillating at even slightly different frequencies), this error results in a clock skew between the clocks 245, 250. In fact, the difference in time between the timestamps of the clocks 245, 250 at the corresponding instances (e.g., packet arrival and packet transmission) is indeterministic and jittery due to the inherent latencies of the two different clocks 245, 250 (e.g., PCIe bus delay). Thus, there must be a manner of compensating for this clock skew.

There are measures that are available to synchronize the clocks 245, 250 in an attempt to eliminate the clock skew. Unfortunately, the COTS NIC hardware that may be incorporated in the networking device 100 may not even include the ART 120. Therefore, these available measures may attempt to synchronize the clocks 245, 250 or the timing information therebetween to a certain degree of accuracy that is not entirely accurate. For example, the available measures may introduce hardware and software latencies that decrease the potential accuracy that would be possible. Accordingly, the forwarding delay measurement, particularly based on the timing information of the clocks 245, 250 only, always suffers from errors caused by jitter when reading the clock 245, 250. In fact, the magnitude of the error may be of the same order or even greater than the duration to forward a packet (i.e., the entire forwarding operation).

With the internal timers or the clocks 245, 250 being insufficient to measure a forwarding delay with a predetermined minimum accuracy, timing information from the ART 120 may be utilized by the exemplary embodiments. As noted above, an advantage of the ART 120 is that a time of the ART 120 may be captured simultaneously with the clocks 245, 250 at a very high accuracy (e.g., an accuracy above one associated with the predetermined minimum accuracy in determining the forwarding delay). In this manner, the ART 120 allows a correlation between timebases to be constructed, particularly between the clocks 245, 250. Therefore, the exemplary embodiments may utilize the capability of the ART 120 to improve the accuracy in calculating the skew between the clocks 245, 250 in determining the forwarding delay. As noted above, the exemplary embodiments being used for network related clocks 245, 250 is only exemplary and the exemplary embodiments may further be used or modified for audio related clocks, serial bus related clocks, etc.

Figure 3:
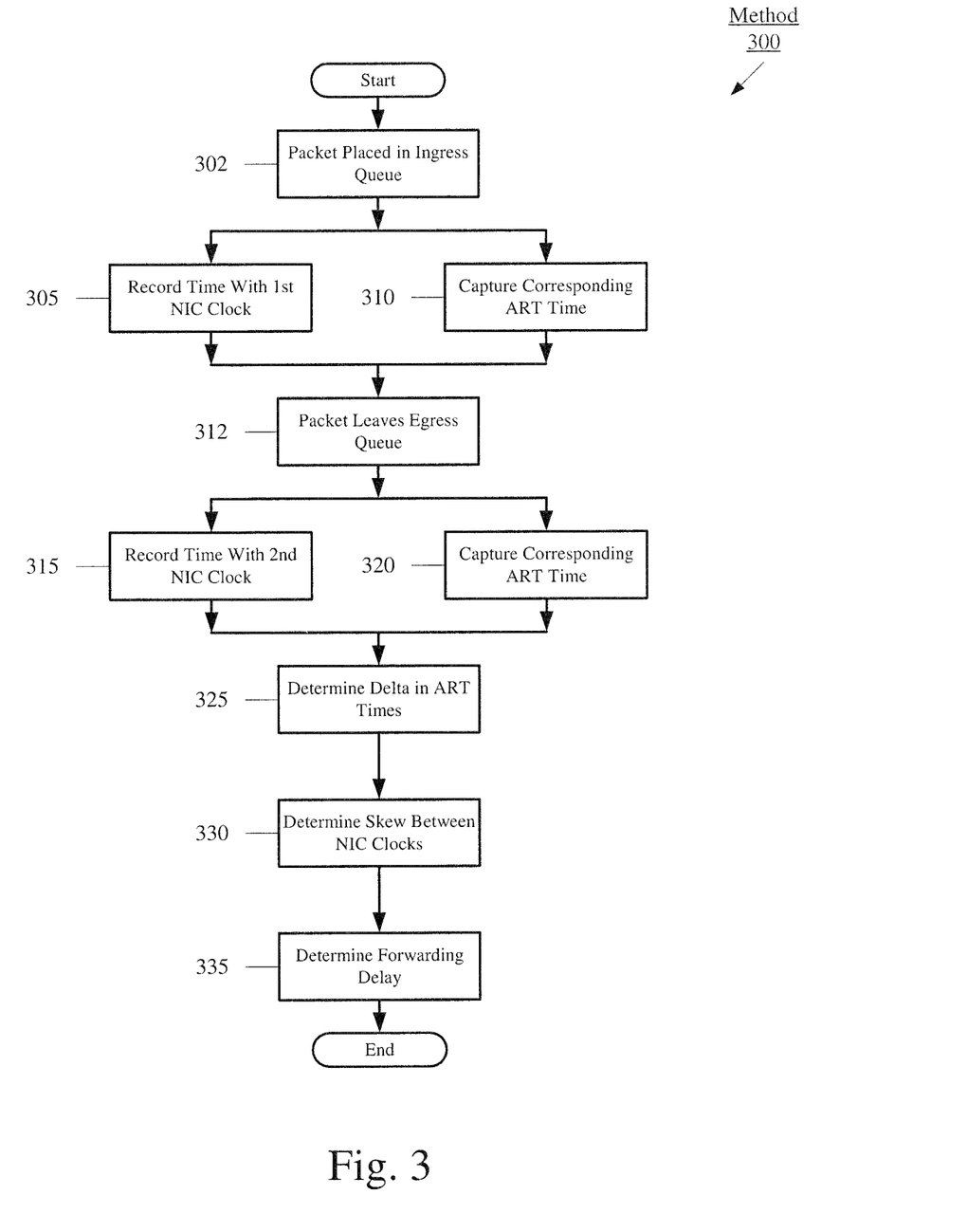
FIG. 3 shows a method for determining a forwarding delay according to the exemplary embodiments.

FIG. 3 shows a method 300 for determining a forwarding delay according to the exemplary embodiments. The method 300 relates to performing a forwarding operation through the networking device 100 where a packet is received, processed, and transmitted. Accordingly, the forwarding delay is the time taken in performing the forwarding operation from the packet being received to the packet being transmitted. It may be assumed that the networking device 100 utilizes the ingress queue 220 and the egress queue 225 such that the forwarding delay includes both a processing delay and a queue delay for both ingress and egress. However, it is again noted that the use of both the queues 220, 225 is only exemplary and the networking device 100 may not use either of the queues 220, 225 or only one of the queues 220, 225 such that the forwarding delay includes the processing delay, the processing delay with the ingress queue delay, or the processing delay with the egress queue delay. The method 300 will be described with regard to the networking device 100 of FIG. 1 and the forwarding aspects shown in the packet route representation 200 of FIG. 2.

In 302, the networking device 100 receives a packet to be forwarded. Specifically, the packet may be received using the ingress port 210 and placed in the ingress queue 220. Accordingly, at this time, the packet may be one of the packets 235A-D. Based on this event occurring, in 305, the clock 245 may generate a reception timestamp when the packet has arrived and has been placed in the ingress queue 220. Simultaneously, in 310, the ART 120 may capture a first ART time corresponding to the reception timestamp. It is again noted that the simultaneous capture may be configured for the correspondence to be at a very high accuracy sufficient in determining the forwarding delay at a level above a predetermined minimum accuracy threshold.

Once the packet has went through the ingress queue 220, the packet may be received by the processing component 205. Accordingly, at this time, the packet may be the packet 230. While at the processing component 205, the packet may be processed and prepared for transmission. Once prepared, the packet may be placed in the egress queue 225.

In 312, the networking device 100 transmits a packet to complete the forwarding operation. Specifically, the networking device 100 may remove the packet from the egress queue 225 and transmit the packet using the egress port 215. Accordingly, at this time while in the egress queue 225, the packet may be one of the packets 240A-D. Based on this eve3nt occurring, in 315, the clock 250 may generate a transmission timestamp when the packet has been removed from the egress queue 225 and transmitted. Simultaneously, in 320, the ART 120 may capture a second ART time corresponding to the transmission timestamp.

In 325, the networking device 100 may determine a component used in determining the clock skew between the clocks 245, 250. Specifically, the first component may be a delta associated with the clock skew for the reception timestamp and the transmission timestamp. The delta may be determined as a difference between the second ART time and the first ART time. Specifically, the delta is determined with:

$$\text{Delta} = \text{ART}\_B - \text{ART}\_A$$

where B corresponds to the transmission and A corresponds to the reception.

In 330, the networking device 100 may determine the clock skew between the clocks 245, 250. As noted above, the clocks 245, 250 may not be synchronized or identically track time due to various latency issues associated with internal timers of COTS NICs. The networking device 100 may first measure a difference between the time of the transmission timestamp and the time of the reception timestamp. Since the Delta is based on the times of the ART 120, the first difference may utilize the times of the timestamps to maintain a common base. By using the delta, the networking device 100 may then measure the clock skew as a difference between the first difference of the times of the clocks 245, 250 and the delta. Specifically, the clock skew is determined with:

$$\text{Clock\_skew} = \text{NIC\_Clock}\_B - \text{NIC\_Clock}\_A - \text{Delta}$$

It is noted that the clock skew may be a unit-less value and not a time as the clock skew represents how the clocks 245, 250 are tracking time differently.

In 335, the networking device 100 may determine the forwarding delay in performing the forwarding operation for the packet that was received and transmitted. With an accurately determined clock skew between the clocks 245, 250, the total forwarding delay may now be measured in a sufficiently accurate manner. Specifically, the networking device 100 may use the basis for determining the forwarding delay based only on the clocks 245, 250. That is, a first difference may be between the transmission timestamp and the reception timestamp. Subsequently, the networking device 100 may measure the forwarding delay as a difference between the first difference of the timestamps of the clocks 245, 250 and the clock skew. Specifically, the forwarding delay is determined with:

$$\text{Delay} = \text{TX\_timestamp} - \text{RX\_timestamp} - \text{Clock\_skew}$$

The exemplary embodiments provide a device, system, and method to accurately measure a forwarding delay associated with performing a forwarding operation in which a packet that is received at a networking device is processed and transmitted. When the networking device utilizes COTS hardware and does not allow for a customization to sufficiently measure the forwarding delay with a minimum accuracy level, the exemplary embodiments are configured to utilize an always running timer to determine a clock skew between the clocks generating timestamps for the reception and transmission of the packet. Thus, the clock skew may be used to adjust the forwarding delay to at least the minimum accuracy level.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Linux platform, a Windows platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   at a networking device including a transceiver and an always running timer (ART):
   generating a first timestamp using a first clock of the transceiver when a packet to be forwarded has been received;
   capturing a first ART time corresponding to the first timestamp;
   generating a second timestamp using a second clock of the transceiver when the packet to be forwarded has been transmitted;
   capturing a second ART time corresponding to the second timestamp; and
   determining a forwarding delay based on the first and second timestamps and the first and second ART times.

2. The method of claim 1, further comprising:
   determining a first difference between the first and second ART times.

3. The method of claim 2, further comprising:
   determining a second difference between a first clock time of the first clock corresponding to the first timestamp and a second clock time of the second clock corresponding to the second timestamp; and
   determining a third difference between the second difference and the first difference.

4. The method of claim 3, further comprising:
   determining a fourth difference between the first timestamp and the second timestamp; and
   determining the forwarding delay as a fifth difference between the fourth difference and the third difference.

5. The method of claim 1, further comprising:
   after receiving the packet, placing the packet in an ingress queue.

6. The method of claim 5, further comprising:
   removing the packet from the ingress queue; and
   processing the packet for preparation to be transmitted.

7. The method of claim 6, further comprising:
   after processing the packet, placing the packet in an egress queue.

8. The method of claim 5, wherein the first timestamp and the first ART time correspond to when the packet is placed in the ingress queue.

9. The method of claim 7, wherein the second timestamp and the second ART time correspond to when the packet leaves the egress queue.

10. The method of claim 1, wherein the networking device includes a commercial off the shelf network interface card.

11. A networking device, comprising:
    a transceiver configured to forward a packet;
    a first clock generating a first timestamp when the packet to be forwarded has been received;
    a second clock generating a second timestamp when the packet to be forwarded has been transmitted;

an always running timer (ART) capturing a first ART time corresponding to the first timestamp and capturing a second ART time corresponding to the second timestamp; and a processor determining a forwarding delay based on the first and second timestamps and the first and second ART times.

12. The networking device of claim 11, wherein the processor further determines a first difference between the first and second ART times.

13. The networking device of claim 12, wherein the processor further determines a second difference between a first clock time of the first clock corresponding to the first timestamp and a second clock time of the second clock corresponding to the second timestamp, wherein the processor further determines a third difference between the second difference and the first difference.

14. The networking device of claim 13, wherein the processor further determines a fourth difference between the first timestamp and the second timestamp, wherein the processor further determines the forwarding delay as a fifth difference between the fourth difference and the third difference.

15. The networking device of claim 11, wherein, after receiving the packet, the processor places the packet in an ingress queue.

16. The networking device of claim 15, wherein the processor further removes the packet from the ingress queue, wherein the processor further processes the packet for preparation to be transmitted.

17. The networking device of claim 16, wherein, after processing the packet, the processor places the packet in an egress queue.

18. The networking device of claim 17, wherein the first timestamp and the first ART time correspond to when the packet is placed in the ingress queue, and wherein the second timestamp and the second ART time correspond to when the packet leaves the egress queue.

19. The networking device of claim 11, wherein the networking device includes a commercial off the shelf network interface card.

20. A networking device, comprising:
a transceiver configured to forward a packet;
a first clock generating a first timestamp when the packet to be forwarded has been received;
a second clock generating a second timestamp when the packet to be forwarded has been transmitted;
an always running tinier (ART) capturing a first ART time corresponding to the first timestamp and capturing a second ART time corresponding to the second timestamp; and
a processor determining a forwarding delay based on the first and second timestamps and the first and second ART times,
wherein the ART is a modular component coupled to the networking device.

* * * * *